No. 757,697. PATENTED APR. 19, 1904.
C. T. UMSTED.
TIRE TIGHTENER.
APPLICATION FILED DEC. 15, 1903.
NO MODEL.
FIG. 1.
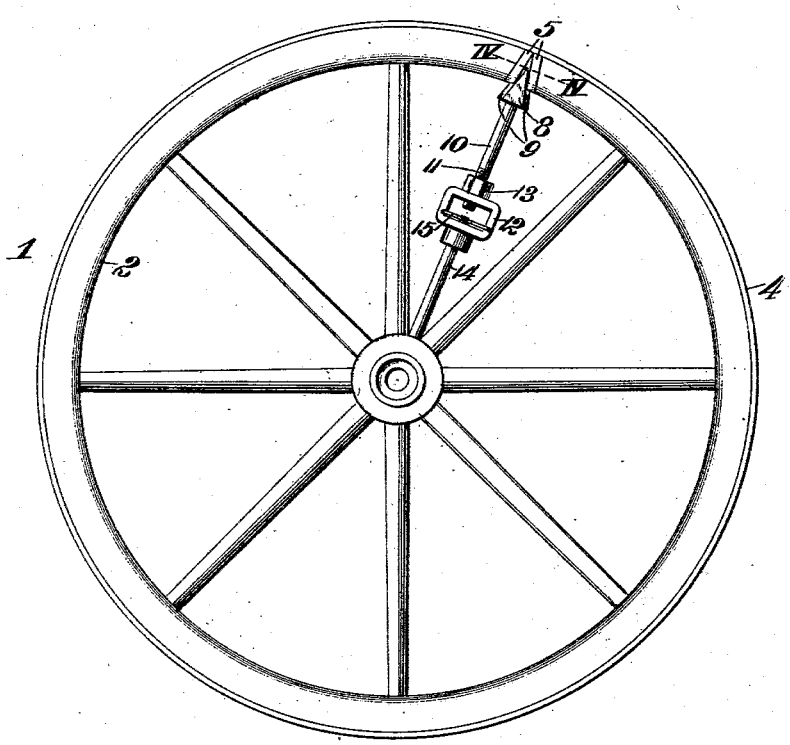
FIG. 2.
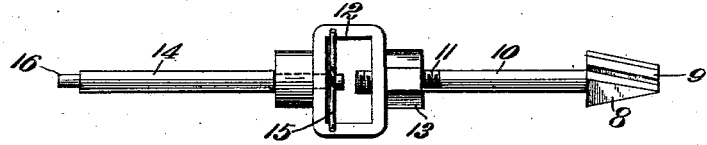
FIG. 5. FIG. 3. FIG. 6.
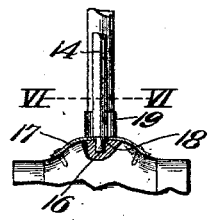 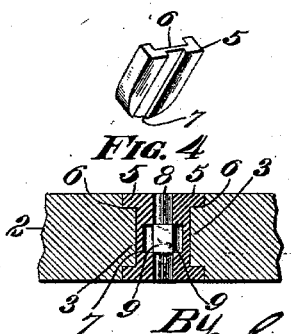 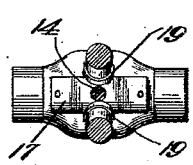
Witnesses
T. P. Glow
H. C. Rodgers
Inventor
C. T. Umsted
By George M. Thorpe
Atty.

No. 757,697. Patented April 19, 1904.

UNITED STATES PATENT OFFICE.

CLIFTON T. UMSTED, OF FORT SCOTT, KANSAS.

TIRE-TIGHTENER.

SPECIFICATION forming part of Letters Patent No. 757,697, dated April 19, 1904.

Application filed December 15, 1903. Serial No. 185,209. (No model.)

*To all whom it may concern:*

Be it known that I, CLIFTON T. UMSTED, a citizen of the United States, residing at Fort Scott, in the county of Bourbon and State of Kansas, have invented certain new and useful Improvements in Tire-Tighteners, of which the following is a specification.

This invention relates to tire-tighteners, and has for its object to produce a device of this character applicable to any ordinary wheel and which performs its functions efficiently and reliably.

A further object is to produce a device of this character of simple, strong, durable, and cheap construction.

To these ends the invention consists in certain novel and peculiar features of construction and organization, as hereinafter described and claimed, and in order that it may be fully understood reference is to be had to the accompanying drawings, in which—

Figure 1 is a side elevation of a vehicle-wheel equipped with a tire-tightener embodying my invention. Fig. 2 is an enlarged side view of the tire-tightener detached from the wheel. Fig. 3 is a perspective view of one of the plates which operate in conjunction with the wedge. Fig. 4 is an enlarged section on the line IV IV of Fig. 1. Fig. 5 is a section showing a modified form of securing the tightener to the hub of the wheel. Fig. 6 is a section on the line VI VI of Fig. 5.

In the said drawings, 1 designates an ordinary wheel having its felly 2 cut at a suitable point in such a manner that its ends shall converge outwardly, said converging ends being beveled so as to leave small projecting portions 3.

The tire 4 encircles the felly in the usual manner and forms a bearing for the outer ends of outwardly-converging wear-plates 5, said wear-plates having sockets 6 in their outer sides to receive the projecting portions 3 of the felly and longitudinal grooves 7 in their opposing faces.

8 designates a wedge adapted to fit tightly between wear-plates 5 and provided with ribs 9 to engage the grooves 7, so as to constitute a tongue-and-groove connection which will prevent the wedge slipping from between the plates. The wedge is provided with a stem 10, threaded at its inner end, as at 11, and engaging a suitable turnbuckle 12, the turnbuckle having the usual central loop portion in which a bar or lever may be fitted to operate said turnbuckle. The latter is also provided with a hexagonal end for engagement by a wrench, if more convenient.

14 is a rod having its outer end of reduced size and cylindrical form and journaled in the turnbuckle, being retained in the latter by means of a spring-cotter 15, which is of sufficient size to prevent the turnbuckle turning accidently. For this reason the spring-cotter is not secured in place until after the tire has been tightened, as will be readily understood. The opposite end of said rod, which of course extends in alinement with wedge-stem 10 and radially of the wheel, is provided with a tenon 16, fitting in the hub, the preferred way of securing the rod to the hub being to secure a plate 17 to the hub, this plate being provided with a central opening 18 to receive the tenon of the rod and with segmental flanges 19 to engage the opposing faces of the contiguous spokes, as shown most clearly in Fig. 6.

To expand the felly so as to fit tightly in the tire, as is frequently necessary in extremely dry seasons of the year, the turnbuckle is manipulated so as to force stem 10 and rod 14 apart, and as the hub prevents longitudinal movement of the rod 14 the wedge itself is forced more deeply between the plates 5, and the felly is expanded. In wet seasons of the year when the tendency of the felly is to unduly expand the turnbuckle is manipulated in a direction opposite to that described and the wedge withdrawn slightly or until the proper relation is established between the felly and the tire. It will thus be seen that the device enables a wheel-felly to be adapted to the tire without regard to the seasons or conditions of the weather and that it performs its functions in a very efficient and reliable manner.

By means of this device, which of course may be made of any suitable or preferred material, the loose-tire nuisance is avoided and there is no possibility of the wheel becoming "dished" in the rainy season of the year.

While I have illustrated and described the preferred construction of the invention, it is apparent that it may be modified in some particulars without departing from the spirit and scope.

Having thus described the invention, what I claim as new, and desire to secure by Letters Patent, is—

1. A tire-tightener, comprising a wheel having a felly cut through with its ends converging outwardly, wear-plates secured to the ends of the felly, and provided with sockets in their outer sides receiving the ends of the felly, and longitudinal grooves at their inner sides, a wedge fitting between said plates and having a tongue-and-groove relation therewith and provided with a threaded stem, a rod secured to the hub of the wheel, and having its outer end reduced, and a turnbuckle journaled on said rod and screwed to said stem.

2. A tire-tightener, comprising a wheel having a felly cut through with its ends converging outwardly, wear-plates secured to the ends of the felly, and provided with sockets in their outer sides receiving the ends of the felly, and longitudinal grooves at their inner side, a wedge fitting between said plates and having a tongue-and-groove relation therewith and provided with a threaded stem, a rod secured to the hub of the wheel and having its outer end reduced, a turnbuckle journaled on said rod and screwed to said stem, and means to lock the turnbuckle from turning on said rod.

3. A tire-tightener comprising a wheel having its felly cut through, wear-plates secured on its ends and having their faces converging outwardly, a wedge fitting between and having a tongue-and-groove relation with said plates and provided with a threaded stem, a plate secured to the hub and provided with a central opening and with segmental flanges engaging the opposite sides of contiguous spokes, a rod bearing at its inner end on said plate between said flanges and having a tenon extending through the hole of the plate and into the hub, and having its outer end reduced and of cylindrical form, a turnbuckle journaled on the reduced end of the rod, and screwed to said wedge-stem, and means to lock the turnbuckle against rotatable movement on the rod.

In testimony whereof I affix my signature in the presence of two witnesses.

CLIFTON T. UMSTED.

Witnesses:
   Geo. C. Kennedy,
   G. L. Garrison.